(12) United States Patent
Niembro et al.

(10) Patent No.: US 10,862,194 B2
(45) Date of Patent: Dec. 8, 2020

(54) WIRELESS COMMUNICATING ELECTRICAL DEVICE AND ELECTRICAL ENCLOSURE COMPRISING THIS ELECTRICAL DEVICE

(71) Applicant: Schneider Electric Industries SAS, Rueil-Malmaison (FR)

(72) Inventors: Alejandro Niembro, Grenoble (FR); Emmanuel Dreina, Grenoble (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 0 days.

(21) Appl. No.: 16/221,656

(22) Filed: Dec. 17, 2018

(65) Prior Publication Data
US 2019/0214705 A1   Jul. 11, 2019

(30) Foreign Application Priority Data
Jan. 11, 2018   (FR) .................................... 18 50240

(51) Int. Cl.
*H01Q 1/24* (2006.01)
*H01Q 13/20* (2006.01)
(Continued)

(52) U.S. Cl.
CPC ............ *H01Q 1/242* (2013.01); *H01H 9/168* (2013.01); *H01P 5/028* (2013.01); *H01Q 1/48* (2013.01);
(Continued)

(58) Field of Classification Search
CPC .......... H01Q 1/24; H01Q 1/242; H01Q 13/20; H01Q 13/206; H01Q 1/22; H01Q 1/36; H01Q 1/48; H01Q 1/50; H01Q 9/30
See application file for complete search history.

(56) References Cited

U.S. PATENT DOCUMENTS 8,554,154 B1 * 10/2013 Everson .................. H01Q 1/24
  455/557
2013/0002376 A1   1/2013 Ihla et al.

FOREIGN PATENT DOCUMENTS

EP          2 927 928 A1   10/2015
WO   WO 2014/044736 A1    3/2014
(Continued)

OTHER PUBLICATIONS

French Preliminary Search Report dated Aug. 28, 2018 in French Application 18 50240, filed on Jan. 11, 2018 (with English Translation of Categories of Cited Documents & Written Opinion).

*Primary Examiner* — Hoang V Nguyen
(74) *Attorney, Agent, or Firm* — Oblon, McClelland, Maier & Neustadt, L.L.P.

(57) ABSTRACT

An electrical device includes an electronic control unit including a radio communication interface provided with a planar internal radio antenna housed inside a first housing of the electrical device and including a first radiating element. The electrical device furthermore includes a movable coupling element connected to an external radio antenna, the coupling element being provided with a second radiating element and being able to be moved between a position connected to the housing of the electrical device and a position disconnected from the housing. In the connected position, the coupling element is positioned facing the internal radio antenna while being separated therefrom by an electrically insulating element, the second radiating element being coupled to the first radiating element so as to receive electromagnetic radiation emitted by the first radiating element.

10 Claims, 7 Drawing Sheets

(51) Int. Cl.
    *H02B 1/30*         (2006.01)
    *H01Q 1/48*         (2006.01)
    *H01Q 9/30*         (2006.01)
    *H01H 9/16*         (2006.01)
    *H02J 13/00*       (2006.01)
    *H01P 5/02*         (2006.01)
    *H04B 7/155*       (2006.01)
    *H01H 71/04*       (2006.01)
    *H02B 1/052*       (2006.01)

(52) U.S. Cl.
    CPC ............. *H01Q 9/30* (2013.01); *H01Q 13/206* (2013.01); *H02B 1/306* (2013.01); *H02J 13/0075* (2013.01); *H04B 7/155* (2013.01); *H01H 71/04* (2013.01); *H02B 1/052* (2013.01)

(56) References Cited

FOREIGN PATENT DOCUMENTS

| | | |
|---|---|---|
| WO | WO 2015/068359 A1 | 5/2015 |
| WO | WO 2016/128668 A1 | 8/2016 |

\* cited by examiner

WIRELESS COMMUNICATING ELECTRICAL DEVICE AND ELECTRICAL ENCLOSURE COMPRISING THIS ELECTRICAL DEVICE

The invention relates to a wireless communicating electrical device. The invention also relates to an electrical enclosure comprising such an electrical device.

The invention applies in particular to devices for managing an electric current, for example measurement or electrical switching and protection devices, such as circuit breakers or contactors, or devices for measuring an electric current.

Nowadays, such electrical devices are commonly equipped with an embedded electronic computer and with wireless communication means. This makes it possible to control and monitor the operation of these devices remotely.

Typically, communication between the electrical device and the outside is achieved via a long-range radio link, for example using a LoRa, SigFox or else LTE or Wi-Fi protocol. To this end, the electrical device includes a radio antenna, which is positioned inside the device.

A problem arises when the device is installed in an electrical enclosure whose walls are made of metal, as is often the case in industrial or domestic electricity distribution installations. The metal walls impede the propagation of the radio waves, such that communication between the device and the outside is worsened, or even becomes impossible.

To rectify this, it is known to use an additional radio antenna, installed outside the electrical enclosure and connected to the device via a wired link, such as a coaxial cable. This requires the electrical device to be provided with a connector, such as an SMA connector, in order to allow said cable to be connected.

However, this solution is not entirely satisfactory, as there is then a risk of electrocution for users. Specifically, the electrical installations to which the electrical device is connected generally have high electric voltages, for example greater than or equal to 110 volts or 230 volts, or even greater. The radio communication means are typically supplied with electric power from these electric voltages. If there is no electrical insulation within the device, the connector risks being accidentally exposed to these electric voltages, which is unacceptable.

To rectify this, it is possible to equip the device with a galvanic isolation system. However, this solution imposes a certain number of technical and industrial constraints, in particular in terms of cost, bulk and manufacturing complexity of the electrical device.

In addition, when the electrical device is manufactured, it is not possible to know what it will be used for by users. If a user decides to situate the device in an electrical enclosure that is not provided with a metal wall, then an external antenna will not be necessary and the galvanic isolation will then be superfluous. It would therefore be necessary to provide several versions of each electrical device, depending on whether or not it will be intended to be used with an external antenna. Such a solution is not applicable in practice, as this would lead to an increase in the number of products for each product range, which would pose problems with respect to industrialization.

There is therefore a need for an electrical management electrical device intended to be installed in an electrical enclosure and allowing wireless communication, so as to rectify the abovementioned drawbacks.

To this end, the invention relates to an electrical device intended to be installed in an electrical enclosure, this electrical device including a device for managing an electric current;
an electronic control unit including a radio communication interface provided with an internal radio antenna housed inside a first housing of the electrical device;
the electrical device being characterized in that the internal radio antenna is a planar antenna including a first radiating element,
in that the electrical device furthermore includes a movable coupling element connected to an external radio antenna, the coupling element being provided with a second radiating element connected to the external radio antenna and being able to be moved between a position connected to the housing of the electrical device and a position disconnected from the housing,
and in that, in the connected position, the coupling element is positioned facing the internal radio antenna while being separated therefrom by an electrically insulating element, the second radiating element being coupled to the first radiating element so as to receive electromagnetic radiation emitted by the first radiating element.

By virtue of the invention, the coupling element ensures a wireless connection between the radio communication interface and the external antenna, without it being necessary to use a wired electrical connector. There is thus a simple means for connecting an external antenna to the electrical device, while at the same time limiting the risk of electrocution of a user, and doing so without it being necessary to equip the device with galvanic isolation.

According to some advantageous but non-mandatory aspects of the invention, such an electrical device may incorporate one or more of the following features, either alone or in any technically permissible combination:

The internal radio antenna includes a dielectric substrate and a ground plane, the first radiating element and the ground plane being formed on opposite faces of the dielectric substrate, and the coupling element includes a second dielectric substrate and a second ground plane, the second radiating element and the second ground plane being formed on opposite faces of the second dielectric substrate.

The ground plane of the coupling element includes a C-shaped metal layer.

The housing of the device includes an internal recess intended to receive the coupling element when it is in the connected position and an internal volume inside which the internal antenna is housed, the internal recess being positioned facing the internal antenna and being separated from the internal antenna by said housing wall.

The coupling element includes a protective housing independent of the housing of the device, the protective housing including at least one error correction element intended to interact with a guide element of complementary form that is formed inside the recess.

The coupling element is housed in a second housing separate from the housing of the device, the second housing having a form analogous or identical to that of the housing of the device, and, in the connected position, said housing is positioned outside the housing of the device.

The insulating element is formed at least partly by a wall of the housing of the device.

The internal antenna is a monopole antenna, such as a quarter-wave antenna.

The control unit includes a printed circuit and the internal antenna is formed on this printed circuit.

In the connected position, the coupling module collects at least 60% of the power radiated by the antenna.

According to another aspect, the invention relates to an electrical enclosure including an electrical device situated inside the electrical enclosure and connected to an electrical installation, this electrical device being such as described above, the external antenna being situated outside the electrical enclosure.

The invention will be better understood and other advantages thereof will become more clearly apparent in the light of the following description of one embodiment of an electrical device, provided solely by way of example and with reference to the appended drawings, in which.

Figure 1:
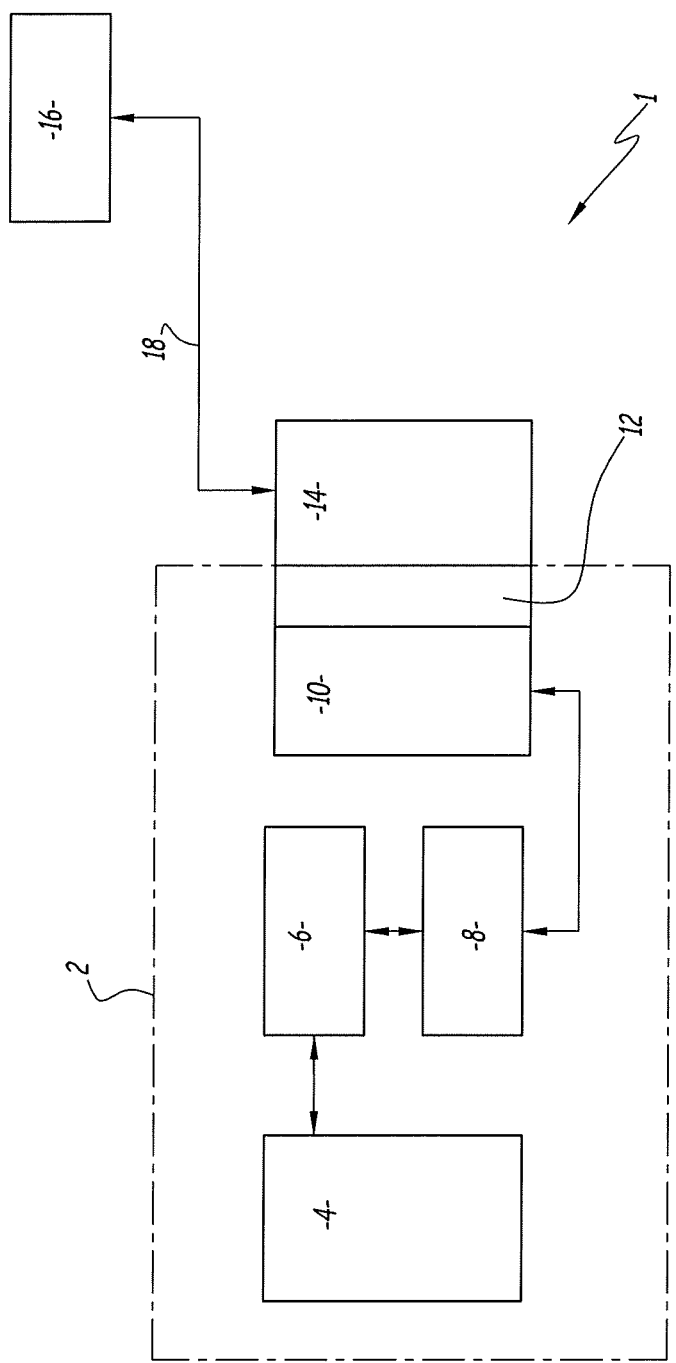
FIG. 1 is a schematic depiction of an electrical device according to the invention.

FIG. 1 shows an electrical enclosure 1 containing an electrical device 2. For example, the enclosure 1 includes walls, not illustrated, which define a recess inside which the device 2 is installed.

The electrical enclosure 1 defined above denotes all types of containers for electrical devices, in particular enclosures, panels, junction boxes, ducts or cable routes.

The electrical device 2 is in this case a device for managing an electric current that is intended to be connected to an electrical installation, for example in order to protect it or monitor the operation thereof.

By way of example, the electrical device 2 is an electrical protection device, such as a circuit breaker. As a variant, it may be a device for switching or for cutting electric current, such as a contactor, a switch or a controllable relay, or any equivalent device. According to other examples, it may be a measurement device, such as an electric meter or a tripping device. Other applications are possible.

The electrical device 2 includes an electric current management device 4, an electronic control unit 6, a radio communication interface 8 connected to the unit 6, and an internal radio antenna 10.

The electrical device 2 furthermore includes a first housing, called main housing, for example a moulded housing made of plastic, inside which the aforementioned components of the device 2 are housed.

In this example, the device 2 is designed to be fastened to a fastening rail inside the enclosure 1, such as a DIN fastening rail, by virtue of appropriate fastening units, in this case formed at the rear of the first housing.

The device 4 in this case makes it possible to manage an electric current flowing within an electrical installation with which the device 2 is associated. For example, the device 4 is able to interrupt the flow of this current in a controlled manner and/or able to measure physical characteristics relating to this electric current (magnitude, power, voltage, phase, etc.). In practice, the device 4 is connected electrically to the electrical installation, for example by way of connection pads.

For example, if the device 2 is an electrical protection device or an electrical switching device, then the device 4 is a device for cutting an electric current, for example having separable contacts.

The control unit 6 is configured to monitor the operation of the device 4 and/or to drive the device 4. For example, the unit 6 is able to control the interruption of an electric current by the device 4, in particular in response to a switching order received from an external emitter by way of the interface 8. According to some embodiments, the unit 6 may also acquire values of electrical variables that are measured by the device 4, for the purpose of transmitting them to a remote receiver external to the device 2, by way of the interface 8.

By way of example, the unit 6 in this case includes a logic computer unit, such as a programmable microcontroller or a microprocessor. The unit 6 also contains one or more computer memories inside which there are recorded executable instructions that make it possible to ensure operation of the device 2.

The radio communication interface 8 is connected to the antenna 10 in order to send and/or receive data by way of a wireless link, in particular a radio link. Thus, the interface 8 allows the device 2 to receive instructions provided by a remote emitter and/or to emit information to a remote receiver. The radio antenna 10 is housed inside the main housing of the device 2. In other words, it is not physically accessible from outside the main housing of the device 2. The antenna 10 may form part of the interface 8.

The antenna 10 is in this case a planar antenna comprising at least one radiating element, preferably in the form of a strip and made of an electrically conductive material. This radiating element is designed to emit electromagnetic radiation when it is supplied with electric power, for example when the interface 8 uses the antenna 10 to emit a radio signal. This radiating element is described in further detail hereinafter under reference 24.

Preferably, the antenna 10 is printed onto a printed circuit or onto a dielectric element such as the internal face of the main housing of the device 2.

For example, the antenna 10 and the interface 8 are designed to communicate using a LoRa or SigFox® or LTE or Wi-Fi radio communication protocol, or any other equivalent technology.

The emission frequency of the antenna 10 is chosen depending on the communication protocol that is chosen. The frequency of the antenna depends in particular on the form and on the dimensions of the radiating element 24. In the present case, by way of illustrative example, the frequency is chosen to be equal to 2.4 GHz. Other frequencies are possible, however.

The movable radio communication module includes a coupling element 14, also called coupling module 14, and an external radio antenna 16 connected electrically to the coupling element 14.

The antenna 16 is in this case connected to the element 14 by way of a cable link 18, such as a coaxial cable. According to optional embodiments, the antenna 16 is movable. For example, the antenna 16 is connected to the link 18 by way of a connector, which bears the reference 61 and 71 in FIGS. 5 and 7, respectively.

Preferably, the antenna 16 is situated outside the electrical enclosure 1. Thus, when the walls of the electrical enclosure 1 are made of metal, the external antenna 16 makes it possible to maintain radio communication between the device 2 and a remote emitter and/or receiver, even when the device 2 is installed inside the electrical enclosure 1.

More precisely, the module 14 includes at least one radiating element analogous to that of the antenna 10 and that is described in more detail hereinafter under reference 34. The antenna 16 is connected to the radiating element of the module 14. The form and frequency of the radiating element(s) of the module 14 are chosen so as to be compatible with the antenna 10. Preferably, the frequency is the same as that of the antenna 10.

In this example, the antenna 10 includes a single radiating element and the module 14 also includes a single radiating element. However, as a variant, the number of radiating element(s) of the antenna 10 and/or of the module 14 may be different. That which is described with reference to the present example is still applicable.

The element 14 is able to be moved reversibly between a position connected to the main housing of the device 2 and a position disconnected from the housing.

In the connected position, the internal antenna 10 is coupled to the module 14, that is to say that at least some of the power radiated by the antenna 10 when it is activated via the interface 8 is received by the module 14 and then transmitted to the external antenna 16. For example, at least 50% or 60% of the power radiated by the antenna 10 is received by the module 14. For example, at least 50%, or at least 60%, and preferably at least 70%, and more preferably at least 75% of the power radiated in the form of radio waves by the radiating element of the antenna 10 is received by the corresponding radiating element of the module 14.

The same applies when the antenna 10 receives radiation emitted by the module 14, for example when a radio signal is received by the antenna 16.

In addition, in the connected position, the internal antenna 10 is positioned facing or near the module 14 while at the same time being physically separated from the module 14 by an electrically insulating element 12.

By way of example, in the connected position, the element 14 is situated facing the internal antenna 10. For example, the element 14 and the antenna 10 are positioned face-to-face and are separated by a distance of less than or equal to 3 cm or, preferably, of less than or equal to 1 cm.

The element 12 permits radio coupling between the antenna 10 and the module 14 while at the same time preventing direct contact between the antenna 10 and the module 14. In particular, the element 12 forms a physical barrier, such as a rigid screen, which preferably does not have an aperture or an electrical connector. It is therefore understood that the antenna 10 and the module 14 are then not able to communicate via a wired link and in this case exchange signals only in the form of radio waves.

In other words, the connection between the antenna 10 and the module 14 (and therefore between the interface 8 and the external antenna 16) is created wirelessly, that is to say that this connection does not require wired electrical continuity between the interface 8 and the external antenna 16. In particular, this connection does not require the presence of a physical connector at an output of the interface 8.

The coupling element 14 then transforms the radiation received into an electrical signal that is transmitted to the external antenna 18, which for its part relays a corresponding radio signal to a remote receiver. As the antenna 18 is situated outside the electrical enclosure 1 accommodating the device 2, the radio signal relayed by the antenna 18 is not disrupted by the walls of the electrical enclosure. The electrical device 2 may therefore be installed in electrical enclosures even when the latter are made of metal or, more generally, are liable to disrupt the transmission of electromagnetic waves.

In the installed position, the element 14 is situated outside the main housing of the device 2. It is not in direct physical contact with elements of the device 2 that may be powered with an electric power supply. In fact, the element 14 is electrically insulated with respect to the electric current flowing through the device 4 and/or from the electric current able to supply the interface 8 with electric power in order ensure operation thereof. In this way, a connection is established between the interface 8 and the antenna 16 without the risk of impairing the safety of users, and without it being necessary to use galvanic isolation within the device 2 in order to protect an electric power supply circuit of the interface 8.

In addition, when the antenna 10 is coupled to the module 14, it generates less radio radiation towards other regions in space, in particular towards the inside of the electrical enclosure 1, since the majority of the radiated power is transmitted to the element 14. By reducing this non-useful radiation in the electrical enclosure 1, electromagnetic compatibility problems that are liable to occur in the electrical enclosure 1 are reduced.

Figure 2:
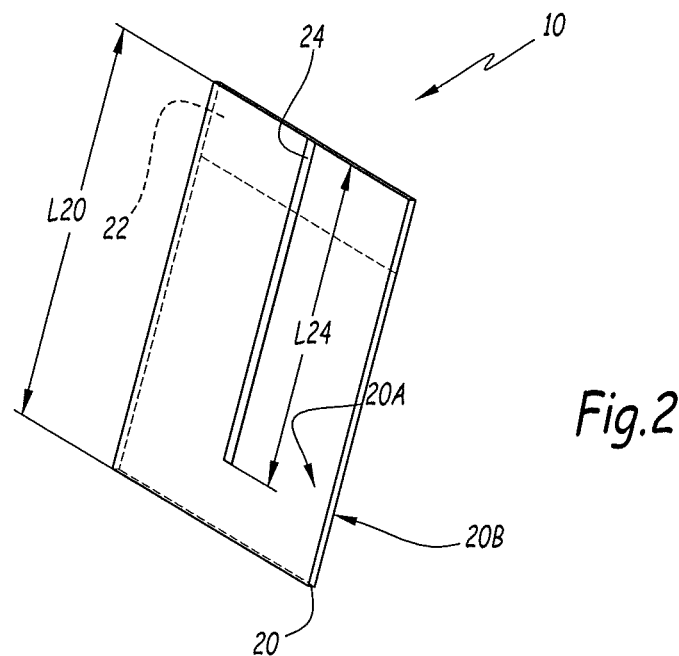
FIG. 2 is a schematic depiction of an example of an internal antenna of the electrical device of FIG. 1, shown in a perspective view.

FIG. 2 shows an example of the antenna 10.

The antenna 10 is preferably a dipole antenna. More particularly, it is a monopole antenna, for example a quarter-wave antenna.

Generally speaking, the antenna 10 preferably includes a dielectric substrate 20, a ground plane 22 and at least one radiating element 24. The antenna 10 thus forms what is called a planar microstrip antenna.

In this embodiment, the dielectric substrate 20 is a planar plate having a quadrilateral shape, for example a rectangle or a square. "L20" is used to denote the length of the substrate 20, measured along its largest side. In this example, the length L20 is less than or equal to 50 cm, for example equal to 40 mm. The substrate 20 is an FR4 epoxy resin plate. Its thickness is in this case less than or equal to 1 mm or to 0.8 mm.

As a variant, other types of planar antenna may be used to produce the antenna 10. According to one example, it is possible to use a slot antenna. According to other examples, the antenna 10 is formed within a wall of the main housing of the device 2, for example by forming the radiating element 24 on an internal face of the main housing of the device 2, this face then serving as a dielectric substrate.

In FIG. 2, the references "20A" and "20B" represent opposite faces of the substrate 20. Preferably, the radiating element 24 and the ground plane 22 are formed on opposite faces of the substrate 20. In this example, the radiating element 24 is formed on the face 20A and the ground plane 22 is formed on the face 20B.

The radiating element 24 includes for example a metal track deposited on the substrate 20. For example, the radiating element 24 has a rectilinear shape. If the antenna 10 is a monopole antenna, a first end of the radiating element 24 is connected to an output of the interface 8. The opposite end forms a hotspot of the antenna 10. The reference "L24" in this case denotes the length of the radiating element 24. For example, the length L24 is equal to 32 mm.

The ground plane 22 is formed by an electrically conductive track, for example made of metal, deposited on the face 20B of the substrate 20. In this example, the ground plane has a rectangular shape formed at the base of the antenna 10. The ground plane 22 is connected to a ground input of the interface 8. For example, a coaxial connector, such as a UFL or MMCX connector, not illustrated, is attached to the base of the antenna 10 so as to allow the radiating element 24 and the ground plane 22 to be connected to the interface 8.

As a variant, this coaxial connector may be omitted, in particular if the antenna 10 is integrated into the interface 8, for example by being formed on a dielectric substrate common with the interface 8.

As a variant, other antenna 10 structures may be used.

According to advantageous but non-essential modes of implementation, the control unit 6 includes a printed circuit including a dielectric substrate on which all or some of the components of the unit 6 are installed. This printed circuit bears the reference 62 in the example of FIG. 5. In this case, the antenna 10 is advantageously formed on this printed circuit, that is to say that the substrate 20 corresponds to the dielectric substrate of the printed circuit of the unit 6. In other words, the substrate 62 is common to the antenna 10 and to the unit 6, or even also to the interface 8.

Figure 3:
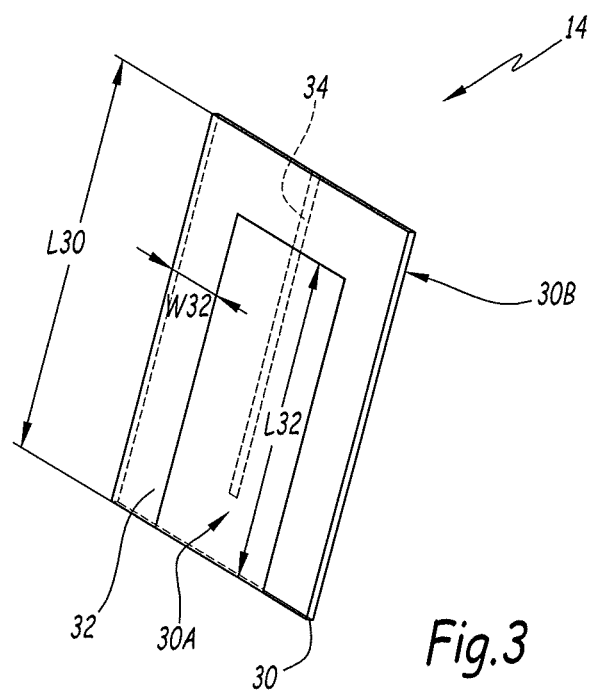
FIG. 3 is a schematic depiction of an example of a coupling element of the system of FIG. 1, shown in a perspective view.

FIG. 3 shows an example of the coupling module 14.

The strip 34 is designed to receive electromagnetic radiation emitted by the strip 24 of the antenna 10 when the coupling element 14 is in the connected position and is situated facing the antenna 10.

Analogously to the operation of the antenna 10, the radiating element 34 is designed to emit electromagnetic radiation corresponding to a signal received by the external antenna 16, this radiation then being received by the antenna 10.

In this example, the coupling element 14 includes a dielectric substrate 30 and a ground plane 32. The radiating element 34 and the ground plane 32 are formed on opposite faces 30A, 30B of the substrate 30. For example, the substrate 30 is in the form of a planar plate. The substrate 30 is preferably made from the same material as the substrate 20.

More precisely, in this example, the ground plane 32 is formed on the face 30A. The radiating element is formed on the opposite face 30B.

The radiating element is in this case rectilinear in shape. A first end, for example the one situated at a base of the substrate 30, is connected to the external antenna 18.

By way of example, in the connected position, the respective substrates 20 and 30 of the antenna 10 and of the module 14 are positioned face-to-face and parallel to one another. The radiating element 24 is preferably aligned with the radiating element 34.

The length of the radiating element 34 is preferably equal to the length L24 of the strip 24. For example, the radiating element 34 is a metal track deposited on the substrate 30.

According to preferred but non-mandatory modes of implementation, the ground plane 34 is C-shaped. More precisely, the ground plane 32 includes three portions in the form of strips that are connected to one another and extend contiguously, each of these portions extending along one of the edges of the substrate 30.

For example, the widths of these strips, indicated by the reference W32, are identical. The width W32, given solely by way of non-limiting illustration, is equal to 7 mm. "L32" is used to denote the length of the lateral strips measured with respect to the edge of the bottom strip. The length L32, also given here solely by way of non-limiting illustration, is in this case equal to 27 mm.

The C-shape of the ground plane makes it possible to promote radio coupling between the antenna 10 and the element 14. Specifically, the element 14 is in the connected position, and the electric field lines are confined and guided to the element 14. An even greater contribution is made to avoiding a situation whereby the antenna radiates electromagnetic waves in all directions when the element 14 is in its connected position. In other words, the radio signal emitted by the antenna 10 is essentially directed to the coupling element 14. This improves the quality of the coupling between the antenna 10 and the element 14 and reduces electromagnetic compatibility problems even further.

Shapes other than a "C"-shape are possible, however.

According to preferred modes of implementation, the insulating element 12 is formed at least partly by a wall of the main housing of the device 2. For example, the internal antenna 10 is positioned inside the main housing by being pressed against an internal face of an external wall of this main housing. The module 14, in the connected position, is designed to be received against the opposite face of this wall.

By way of example, the insulating element 12 has a thickness of 2 mm. The material forming this wall 12 has an effective electrical permeability equal to 2.4. For example, the element 12 is a plastic, such as polyamide PA66.

Figure 8:
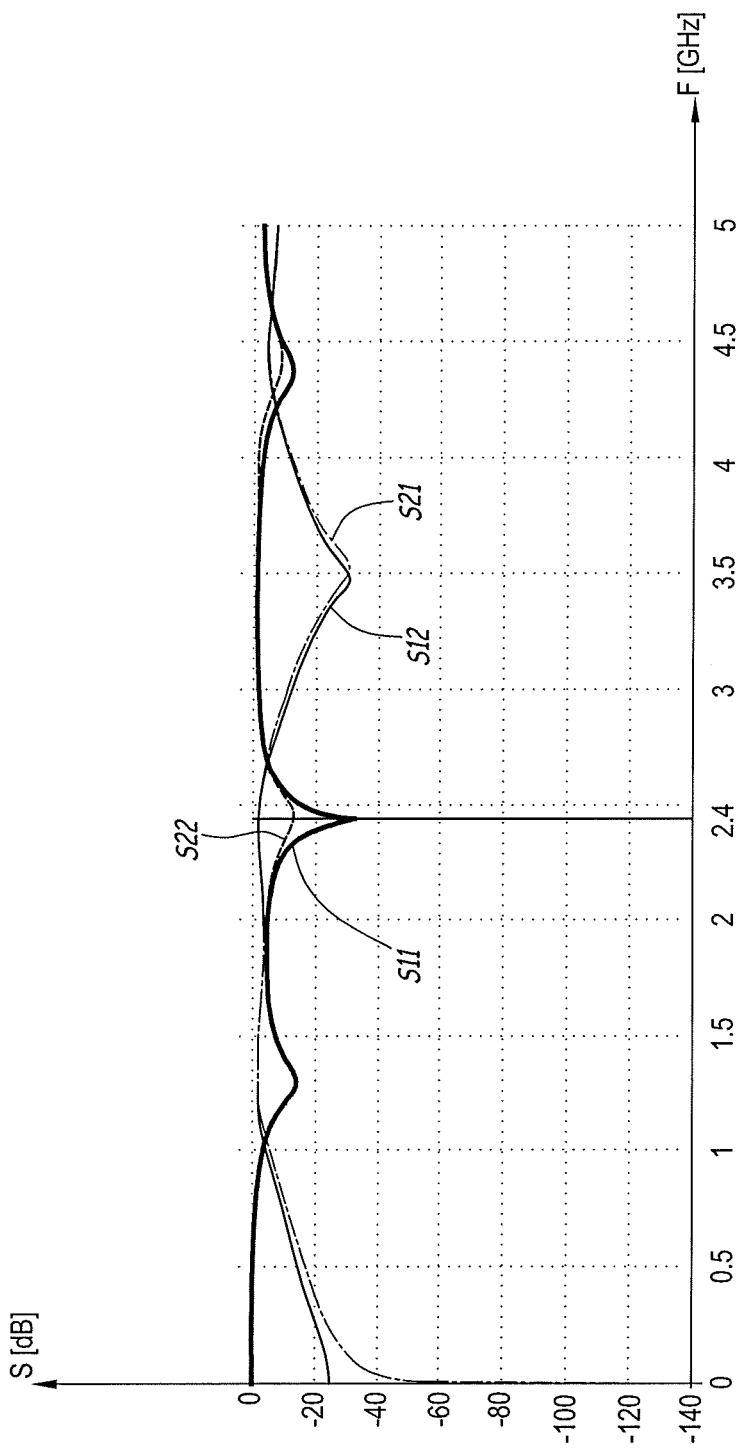
FIG. 8 is a graph showing the amplitude of the transmission and reflection parameters of the system formed by combining the antenna of FIG. 2 with the coupling element of FIG. 3, as a function of the frequency of the radio signal.

FIG. 8 illustrates, by way of example, the evolution of amplitude values of the transmission and reflection coefficients of the system formed by combining the antenna 10 with the element 14, both described above by way of example, as a function of the frequency F of a radio signal expressed in gigahertz. Such coefficients are known under the name "S parameters" and are denoted S11, S21, S12 and S22. Their definition is known and is not described in detail. In this example, S11 is the reflection coefficient of the antenna 10, S22 is the reflection coefficient of the module 14, S21 is the transmission coefficient from the antenna 10 to the module 14, and S12 is the transmission coefficient from the module 14 to the antenna 10.

In this example, for the frequency 2.4 GHz, the antenna 10 and the module 14 have a reflection coefficient of less than −12 dB. The transmission coefficient is equal to −1.4 dB. In other words, around 72% of the power emitted by the antenna 10 is collected by the element 14. In this configuration, the gain of the antenna is −3.86 dBi, with a total efficiency of 6.8%.

FIGS. 4 to 7 show construction variants for the device 2.

Figure 4:
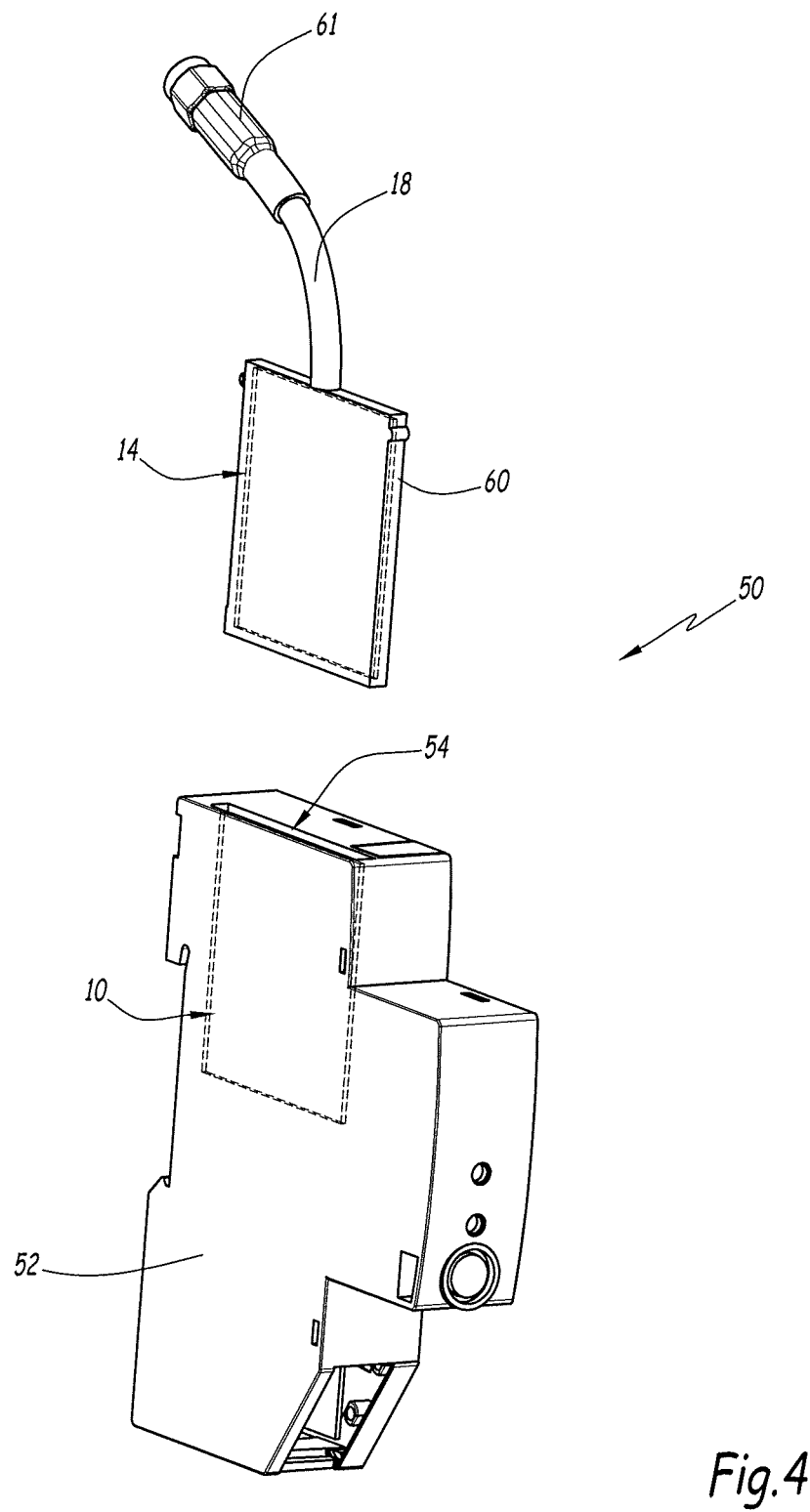
FIG. 4 is a schematic depiction of the system of FIG. 1 in a partially exploded view and according to a first embodiment of the invention.
Figure 5:
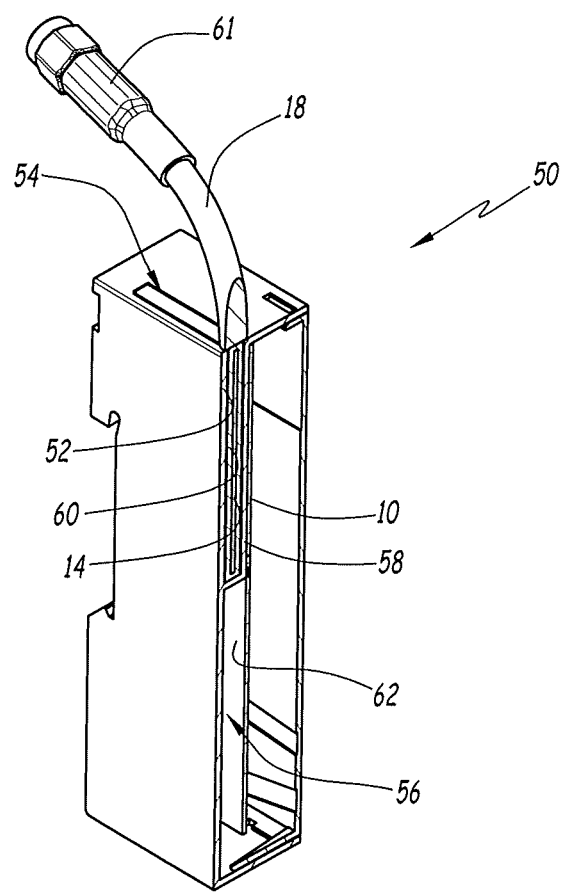
FIG. 5 is a schematic depiction of the system of FIG. 4 in a cross-sectional view.

More precisely, FIGS. 4 and 5 illustrate an electrical device 50 according to a first embodiment of the device 2. Everything that has been described above with reference to the operation of the device 2, and in particular with reference to the antenna 10 and to the element 14, applies to this first embodiment.

The reference 52 in this case denotes the main housing of the device 2. This housing 52 defines both a main volume 56 and an auxiliary recess 54 that are separated from one another by an internal wall 58. The recess 54 is accessible from outside the housing 52 via a slot. The recess 54 is intended to receive the element 14 when the latter is in its connected position. The internal antenna 10 is housed inside the volume 56 and is not physically accessible from the recess 54. Thus, in this first embodiment, the insulating element 12 is formed by a part of the internal wall 58.

The module 14 is in this case housed in a protective housing 60 independent of the main housing 52. In the connected position of the module 14, the housing 60 is received inside the recess 54 but remains outside the volume 56. In the disconnected position of the module 14, the housing 60 is situated outside the recess 54. It is therefore understood that the recess 54 has a form complementary to that of the housing 60 and that the housing 60 is designed to pass through the slot. Movement between these two positions is achieved in this case by translation of the housing 60. The element 14 is illustrated in its disconnected position in FIG. 4 and in its connected position in FIG. 5.

In FIGS. 4 and 5, the external antenna 16 is not illustrated. The reference 61 denotes a connector positioned on a distal end of the wired link 18.

The recess 54 is preferably positioned facing the location of the antenna 10. In other words, the antenna 10 is positioned against a face of the wall 58, and the recess 54 is formed on the opposite side of this wall 58.

The device 50 thus makes it possible to receive the module 14 without excessively increasing the bulk of the housing 52. This is particularly useful when the device 50 has to be used within electrical enclosures in which space is limited.

According to preferred modes of implementation, the housing 60 includes error correction elements that are able to interact with elements of complementary form that are formed inside the recess 54. This makes it possible to stipulate a predefined direction of insertion of the housing 60 with respect to the housing 52 when it is inserted into the recess 54, for example so that, in the connected position, the element 14 is aligned with the antenna 10 and/or as close as possible to the wall 58.

For example, the housing 60 includes one or more protuberances, visible in FIG. 4, that are positioned in a manner projecting from the edge of the housing 60. The recess 54 includes, on internal walls of the housing, one or more guide elements, such as notches or grooves, not illustrated, for receiving and guiding the protuberances when the housing 60 is inserted into the recess 54. As a variant, it is the protuberance(s) that is (are) positioned inside the recess 54, and it is the notch(es) of complementary form that is (are) formed on the housing 60.

Figure 6:
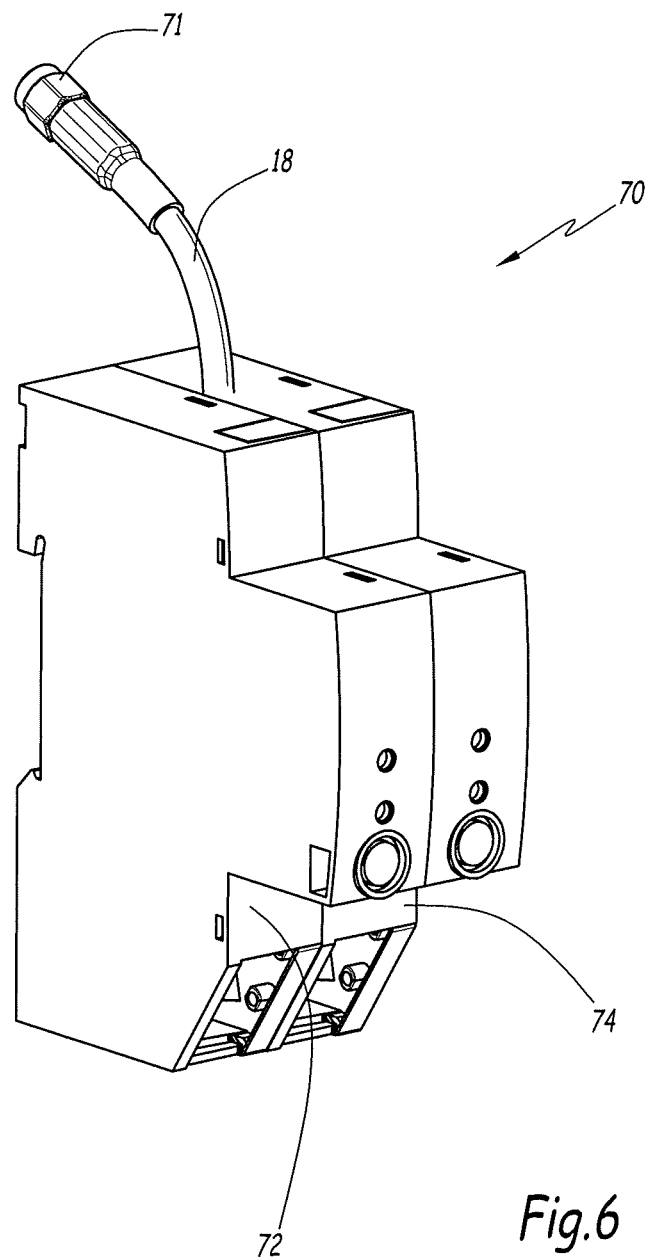
FIG. 6 is a schematic depiction of an example of the system of FIG. 1 according to a second embodiment of the invention.
Figure 7:
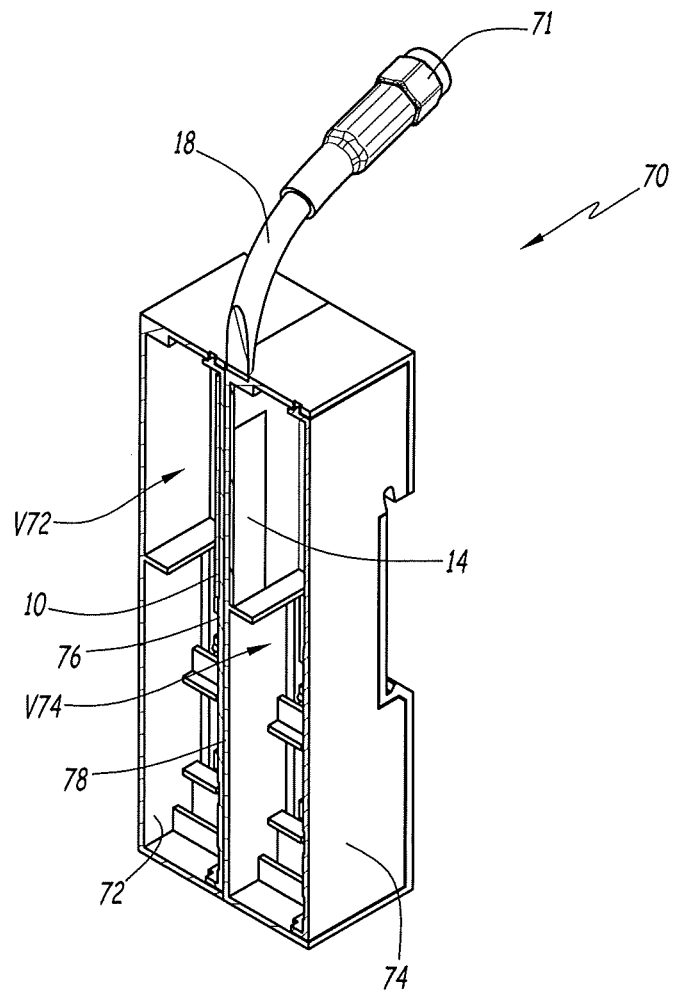
FIG. 7 is a schematic depiction of the system of FIG. 6 in a cross-sectional view.

FIGS. 6 and 7 illustrate an electrical device 70 according to a second embodiment of the device 2. The elements of the electrical device 70 according to this second embodiment that are analogous to those of the first embodiment bear the same references and are not described in detail, in so far as the above description is able to be transposed to them. Furthermore, the description given above of the device 2, and in particular with reference to the antenna 10 and to the element 14, applies to this second embodiment.

In this example, the device 70 includes two housings 72 and 74 that preferably have a similar or even identical form. The references V72 and V74 denote the internal volumes of the housings 72 and 74, respectively. The housing 72 performs the role of main housing of the device 70. The antenna 10 is therefore housed inside the housing 72. The element 14, for its part, is housed inside the housing 74.

In the connected position, the housing 74 is situated at the side of the housing 72, in contact therewith, while being aligned therewith. For example, the housings 72 and 74 are attached to one and the same fastening rail within the electrical enclosure 1. Preferably, each of these housings 72 and 74 is provided with fastening units allowing them to be attached to one and the same fastening rail.

Inside the housing 72, the internal antenna 10 is situated in contact with an internal face of an external wall 76 of the housing 72. Analogously, inside the second housing 74, the element 14 is situated against an internal face of an external wall 78 of the housing 74. In the connected position, the walls 76 and 78 are in contact with one another and face one another. In this way, the element 14 is situated facing the antenna 10, aligned therewith, while at the same time being separated therefrom by the walls 76 and 78. Thus, in this second embodiment, the insulating element 12 is formed by the walls 76 and 78.

This second embodiment may thus be implemented without the need to modify the architecture of the housing 72. In other words, it is enough to take an existing housing 74, for example identical to that of the housing 72, and to equip it with an element 14 and the wired link 18.

The embodiments and the variants contemplated above may be combined with one another so as to create new embodiments.

The invention claimed is:

1. An electrical device to be installed in an electrical enclosure, said electrical device comprising:
   a device configured to manage an electric current;
   an electronic controller including a radio communication interface provided with an internal radio antenna housed inside a first housing of the electrical device;
   wherein the internal radio antenna is a planar antenna including a first radiating element,
   wherein the electrical device further comprises a movable coupling element connected to an external radio antenna, the coupling element being provided with a second radiating element connected to the external radio antenna and being configured to be moved between a position connected to the first housing of the electrical device and a position disconnected from the first housing,
   wherein, in the connected position, the coupling element is positioned facing the internal radio antenna while being separated therefrom by an electrically insulating element, the second radiating element being coupled to the first radiating element to receive electromagnetic radiation emitted by the first radiating element,
   wherein the internal radio antenna comprises a dielectric substrate and a ground plane, the first radiating element and the ground plane being formed on opposite faces of the dielectric substrate, and
   wherein the coupling element includes a second dielectric substrate and a second ground plane, the second radiating element and the second ground plane being formed on opposite faces of the second dielectric substrate.

2. The electrical device according to claim 1, wherein the ground plane of the coupling element comprises a C-shaped metal layer.

3. The electrical device according to claim 1, wherein the housing of the device comprises an internal recess intended to receive the coupling element when it is in the connected position and an internal volume inside which the internal antenna is housed, the internal recess being positioned facing the internal antenna and being separated from the internal antenna by said housing wall.

4. The electrical device according to claim 3, wherein the coupling element comprises a protective housing independent of the first housing of the device, the protective housing including at least one error correction element configured to interact with a guide element of complementary form that is formed inside the recess.

5. The electrical device according to claim 1, wherein the coupling element is housed in a second housing separate from the first housing of the device, the second housing having a form analogous or identical to that of the first housing of the device, and wherein, in the connected position, said second housing is positioned outside the first housing of the device.

6. The electrical device according to claim 1, wherein the insulating element is formed at least partly by a wall of the first housing of the device.

7. The electrical device according to claim 1, wherein the internal antenna is a monopole antenna.

8. The electrical device according to claim 1, wherein the controller comprises a printed circuit and the internal antenna is formed on the printed circuit.

9. The electrical device according to claim 1, wherein, in the connected position, the coupling module collects at least 60% of the power radiated by the antenna.

10. An electrical enclosure comprising an electrical device situated inside the electrical enclosure and connected to an electrical installation, wherein the electrical device is in accordance with claim 1, the external antenna being situated outside the electrical enclosure.

* * * * *